US012229665B2

(12) United States Patent
Allison et al.

(10) Patent No.: US 12,229,665 B2
(45) Date of Patent: Feb. 18, 2025

(54) SECURE SEARCH ENGINE UTILIZING A LEARNING ENGINE

(71) Applicant: Pacaso Inc., Cincinnati, OH (US)

(72) Inventors: Gregory Austin Allison, Napa, CA (US); Douglas Anderson, San Francisco, CA (US); Daivak Sunil Shah, Fremont, CA (US)

(73) Assignee: Pacaso Inc., Cincinnati, OH (US)

( * ) Notice: Subject to any disclaimer, the term of this patent is extended or adjusted under 35 U.S.C. 154(b) by 1020 days.

(21) Appl. No.: 17/163,192

(22) Filed: Jan. 29, 2021

(65) Prior Publication Data

US 2022/0245442 A1    Aug. 4, 2022

(51) Int. Cl.
*G06N 3/08* (2023.01)
*G06F 16/2457* (2019.01)
(Continued)

(52) U.S. Cl.
CPC ......... *G06N 3/08* (2013.01); *G06F 16/24578* (2019.01); *G06F 16/2477* (2019.01);
(Continued)

(58) Field of Classification Search
CPC .......... G06N 3/08; G06N 3/044; G06N 3/063; G06N 3/04; G06N 3/06; G06F 16/2477; G06F 16/24578; G06F 16/29
See application file for complete search history.

(56) References Cited

U.S. PATENT DOCUMENTS 5,987,420 A    11/1999  Maeda
7,818,190 B1   10/2010  Sutherland
(Continued)

FOREIGN PATENT DOCUMENTS

BR    102013027042 A2    8/2015
CN       100410899 C     8/2008
(Continued)

OTHER PUBLICATIONS

Fatemeh Khazaee Fadafan, "Developing a non-compensatory approach to identify suitable zones for intensive tourism in an environment sensitive landscape," 2018, Ecological Indicators 87, pp. 152-166. (Year: 2018).
(Continued)

*Primary Examiner* — Kamran Afshar
*Assistant Examiner* — Brian J Hales
(74) *Attorney, Agent, or Firm* — Knobbe, Martens, Olson & Bear LLP

(57) ABSTRACT

Methods and systems are disclosed for securely searching for physical resources. Attributes of a plurality of shared physical resources are accessed. An encrypted communication is received and decrypted that provides attributes for a first user. A search is performed, using a first neural network, for physical resources corresponding to attributes of the user to identity a first set of physical resources using decrypted attributes of the user and attributes of the plurality of physical resources. Search match scores are generated for the first set of physical resources. A subset of physical resources that at least one other user has access to is identified. A second neural network identifies users associated with the subset of physical resources that have a temporal usage conflict likelihood with the user. Search match scores may be adjusted. The search results may be ranked using the adjusted search match scores, and the ranked search results may be displayed.

30 Claims, 9 Drawing Sheets

(51) Int. Cl.
  *G06F 16/2458* (2019.01)
  *G06F 16/29* (2019.01)
  *G06N 3/044* (2023.01)
  *G06N 3/063* (2023.01)
(52) U.S. Cl.
  CPC ............. *G06F 16/29* (2019.01); *G06N 3/044* (2023.01); *G06N 3/063* (2013.01)

(56) References Cited

U.S. PATENT DOCUMENTS

| | | |
|---|---|---|
| 8,108,895 B2 | 1/2012 | Anderson |
| 8,472,612 B1 | 6/2013 | Goringe |
| 9,811,785 B1 | 11/2017 | Bion |
| 11,145,016 B1 | 10/2021 | Brophy |
| 2003/0061260 A1 | 3/2003 | Rajkumar |
| 2003/0078897 A1 | 4/2003 | Florance et al. |
| 2004/0215780 A1 | 10/2004 | Kawato |
| 2007/0189274 A1 | 8/2007 | Liu |
| 2008/0059252 A1 | 3/2008 | Boyer |
| 2008/0091480 A1 | 4/2008 | Geoghegan et al. |
| 2008/0249828 A1 | 10/2008 | Vicino |
| 2008/0249829 A1 | 10/2008 | Vicino |
| 2009/0030743 A1 | 1/2009 | Tussy |
| 2011/0078138 A1 | 3/2011 | Cardella |
| 2011/0099038 A1 | 4/2011 | Nishida |
| 2013/0073387 A1 | 3/2013 | Heath |
| 2013/0073389 A1 | 3/2013 | Heath |
| 2013/0073400 A1 | 3/2013 | Heath |
| 2013/0073473 A1 | 3/2013 | Heath |
| 2013/0254072 A1 | 9/2013 | Eraker et al. |
| 2014/0081678 A1 | 3/2014 | Reynolds |
| 2014/0358943 A1* | 12/2014 | Raymond ............. G06Q 50/16 707/748 |
| 2015/0019272 A1 | 1/2015 | Truong |
| 2016/0155181 A1 | 6/2016 | Romaya et al. |
| 2016/0217523 A1 | 7/2016 | Goodrich et al. |
| 2018/0190056 A1 | 7/2018 | Desinor, Jr. |
| 2018/0211117 A1 | 7/2018 | Ratti |
| 2018/0343140 A1 | 11/2018 | Driedger |
| 2018/0365645 A1 | 12/2018 | Gillen |
| 2019/0034837 A1* | 1/2019 | Lou ........................ G06N 20/00 |
| 2019/0034848 A1 | 1/2019 | Jamieson |
| 2019/0213228 A1* | 7/2019 | Charkov ........... G06F 16/24578 |
| 2019/0279235 A1 | 9/2019 | Kaneichi et al. |
| 2019/0311044 A1 | 10/2019 | Xu |
| 2020/0167631 A1 | 5/2020 | Rezgui |
| 2020/0204522 A1 | 6/2020 | Binder |
| 2020/0319784 A1 | 10/2020 | Sinclair |
| 2021/0027559 A1 | 1/2021 | Fisher |
| 2021/0125207 A1 | 4/2021 | Banerjee |
| 2022/0116736 A1 | 4/2022 | Williams |

FOREIGN PATENT DOCUMENTS

| | | |
|---|---|---|
| CN | 100422932 C | 10/2008 |
| CN | 105763851 A | 7/2016 |
| CN | 106507285 A | 3/2017 |
| CN | 106557582 A | 4/2017 |
| WO | WO 2007/032529 A1 | 3/2007 |
| WO | WO 2010/022274 A1 | 2/2010 |
| WO | WO 2020/039821 A1 | 2/2020 |
| WO | WO 2020/050906 A1 | 3/2020 |

OTHER PUBLICATIONS

International Search Report and Written Opinion, regarding International Application No. PCT/US2021/041648, mailed Nov. 11, 2021, 9 pages.

Brown et al, "Mapping and Measuring Place Attachment," Applied Geography, Feb. 2015, pp. 42-53, Applied Geography, vol. 57, https://doi.org/10.1016/j.apgeog.2014.12.011.

Keramati et al., "Developing a Prediction Model for Customer Churn from Electronic Banking Services Using Data Mining," Financial Innovation, 2016, pp. 1-14, vol. 2(10), DOI: 10.1186/s40854-016-0029-6.

Shao, et al. "A simple reservation and allocation model of shared parking lots. Transportation Research Part C:" *Emerging Technologies*, 71, pp. 303-312. (Year: 2016).

* cited by examiner

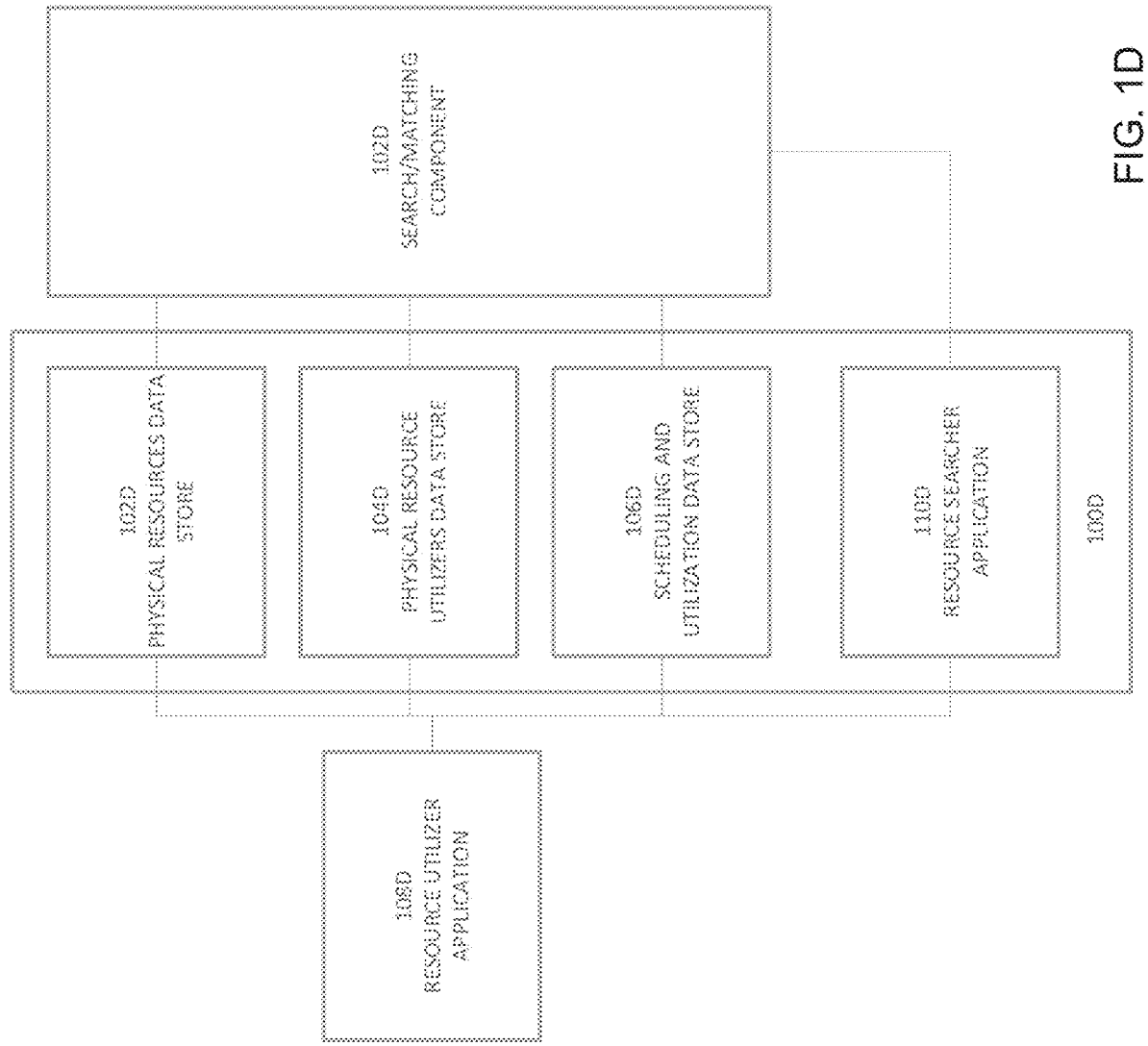

The Oasis
PALM SPRINGS

$725,000
1/8 OWNERSHIP

SHARE LISTING

ADDRESS
594 W Stevens Rd, Palm Springs, CA

ATTRIBUTES
5 Beds 7 Baths 5,073 sq ft

TOUR

FIG. 6

SECURE SEARCH ENGINE UTILIZING A LEARNING ENGINE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to performing searches.

Description of the Related Art

Conventionally, search engines may provide inadequately customized search results to disparate sets of users.

For example, a conventional search engine may utilize an indexing system for identifying content accessible at various networked locations. A user may enter a search query into a search field, where the search query may include one or more text search terms. Such a conventional may utilize the index to identify content that is relevant to a user's search query terms, but without taking into account certain unique characteristics of the user that are not included in the search query.

Thus, certain conventional search engines may not provide or sort search results in a manner that adequately corresponds with a given user's unique interests and characteristics.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure herein relates to methods and systems configured to enable securely searching for physical resources. Attributes of a plurality of shared physical resources are accessed. An encrypted communication is received and decrypted that provides attributes for a first user. A search is performed, using a first neural network, for physical resources corresponding to attributes of the user to identity a first set of physical resources using decrypted attributes of the user and attributes of the plurality of physical resources. Search match scores are generated for the first set of physical resources. A subset of physical resources that at least one other user has access to is identified. A second neural network identifies users associated with the subset of physical resources that have a temporal usage conflict likelihood with the user. Search match scores may be adjusted. The search results may be ranked using the adjusted search match scores, and the ranked search results may be displayed.

An aspect of the present disclosure relates to a system configured to enable searches for physical resources, comprising: a network interface; at least one processing device operable to: access attributes of a plurality of physical resources, wherein a given physical resource in the plurality of physical resources is configured to be shared amongst a plurality of physical resource users in a time displaced manner; receive over a network, using the network interface, an encrypted communication providing attributes for a first user; decrypt the encrypted communication providing attributes for the first user; search for physical resources in the plurality of physical resources that correspond with attributes of the first user, wherein a first neural network is used to identity a first set of physical resources in the plurality of physical resources using the decrypted attributes of the first user and the attributes of the plurality of physical resources; generate and associate respective match scores with physical resources in the first set of physical resources identified using the first neural network; identify a subset of physical resources comprising physical resources in the first set of physical resources that at least one other user of the system has received a right to use; identify, using a second neural network, users associated with the subset of physical resources that have at least a first likelihood of temporal usage conflicts with the first user; based at least in part on the identified users associated with the subset of physical resources that have at least the first likelihood of temporal usage conflicts with the first user, adjusting one or more match scores associated with one or more physical resources in the subset of physical resources; generate, based at least in part on the adjusted match scores, ranked search results for the first set of physical resources identified using the first neural network; provide the ranked search results, generated based at least in part on the adjusted match scores, to the first user device, the ranked search results configured to be displayed by the first user device.

An aspect of the present disclosure relates to a computer-implemented method, the method further comprising: accessing, by a computer system comprising one or more computing device, attributes of a plurality of physical resources, wherein a given physical resource in the plurality of physical resources is configured to be shared amongst a plurality of physical resource users in non-overlapping time periods; receiving over a network at the computer system a communication providing attributes for a first user; searching for and identifying, using the computer system, a first set of physical resources, in the plurality of physical resources, that correspond to the attributes of the first user using the attributes of the plurality of physical resources; generating and associating, using the computer system, respective match scores with physical resources in the first set of physical resources; identifying, using the computer system, a subset of physical resources comprising physical resources in the first set of physical resources that at least one other user of the system has received a right to use; identifying, using the computer system, users associated with the subset of physical resources that have at least a first likelihood of temporal usage conflicts with the first user; based at least in part on the identified users associated with the subset of physical resources that have at least the first likelihood of temporal usage conflicts with the first user, generating, using the computer system, one or more refined match scores associated with one or more physical resources in the subset of physical resources; generating, using the refined match scores, ranked search results for at least a portion of the first set of physical resources; providing the ranked search results, generated using the refined match scores, to the first user device, the ranked search results configured to be displayed by the first user device.

An aspect of the present disclosure relates to a non-transitory computer readable memory having program instructions stored thereon that when executed by a computer system device cause the computer system to perform operations comprising: access attributes of a plurality of physical resources, wherein a given physical resource in the plurality of physical resources is configured to be shared amongst a plurality of physical resource users in non-overlapping time periods; access attributes for a first user; identify, using the attributes of the plurality of physical resources, a first set of physical resources in the plurality of physical resources that correspond to the attributes of the first user; identify a subset of physical resources comprising physical resources in the first set of physical resources that at least one other user of the system has received a right to use; identify users associated with the subset of physical resources that have at least a first likelihood of temporal usage conflicts with the first user; based at least in part on the identified users associated with the subset of physical resources that have at least the first likelihood of temporal usage conflicts with the first user, generate one or more match scores associated with one or more physical resources in the subset of physical resources; generate, based at least in part on the generated match scores, ranked search results using the first set of physical resources; provide the ranked search results, generated based at least in part on the generated match scores, to the first user device, the ranked search results configured to be displayed by the first user device.

An aspect of the present disclosure relates to allocation of physical resources based on predicted utilization demand. Historical resource reservation data for a physical resource is accessed, wherein the physical resource is shared amongst a plurality of physical resource users in a time displaced manner. Historical event data, comprising event types and event dates, is accessed. Correlations between historical reservation data and the historical event data are identified and are used to predict future high demand dates. A notification is generated regarding a first predicted future high demand date, including a reservation initiation control via which a reservation may be initiated for the physical resource for the first predicted future high demand date. The notification may be transmitted to physical resource user(s), and in response to a detection of an activation of the reservation initiation control, a corresponding reservation for the physical resource is registered and the physical resource may be accordingly utilized.

An aspect of the present disclosure relates to allocation of physical resources based on predicted utilization demand utilizing a learning engine. Historical resource reservation data for a physical resource is accessed, wherein the physical resource is shared amongst physical resource users in a time displaced manner. Historical event data, comprising event types and event dates, is accessed. Correlations between historical reservation data and the historical event data are identified and are used by a learning engine to predict future high demand dates. A notification is generated regarding a predicted future high demand date, including a control via which a request may be initiated for the physical resource for the first predicted future high demand date. The notification may be transmitted to physical resource user(s), and in response to a detection of an activation of the request initiation control, a corresponding allocation for the physical resource is registered and the physical resource may be accordingly utilized.

An aspect of the present disclosure relates to a system configured to enable allocation of physical resources, comprising: a network interface; at least one processing device operable to: access historical utilization data, comprising occupancy data, for a first physical resource, the historical utilization data comprising dates at which the first physical resource was utilized by a given user, wherein the first physical resource is shared amongst a plurality of physical resource users in a time displaced manner; access historical event data, the historical event date comprising event types and event dates; use a neural network comprising an error function to identify correlations between historical utilization data, comprising occupancy data, and the historical event data, comprising event types and event dates; based at least in part on the identified correlations between historical utilization data, comprising occupancy data, and the historical event data, comprising event types and event dates, predict future high utilization dates for the first physical resource; generate a notification regarding at least a first predicted future high utilization date, the notification including a control via which a reservation may be initiated for the first physical resource for the first predicted future high utilization date; transmit the notification regarding the first predicted future high utilization date to at least one physical resource user in the plurality of physical resources users; at least partly in response to a detection of an activation of the control via which a reservation may be initiated for the first physical resource for the first predicted future high utilization date, registering a corresponding reservation for the first physical resource for the first predicted future high utilization date.

An aspect of the present application relates to a computer-implemented method, the method comprising: using a computer system comprising one or more computer devices, accessing historical demand data comprising reservation data for a first physical resource, the historical demand data comprising dates at which the first physical resource was reserved by a given user, wherein the first physical resource is shared amongst a plurality of physical resource users in a time displaced manner; accessing, using the computer system, historical event data, the historical event date comprising event types and event dates; identifying, using the computer system, correlations between historical demand data, comprising reservation data, and the historical event data, comprising event types and event dates; based at least in part on the identified correlations between historical demand data, comprising reservation data, and the historical event data, comprising event types and event dates, predicting future high demand dates for the first physical resource; generating a notification regarding at least a first predicted future high demand date, the notification including a control via which a reservation may be initiated for the first physical resource for the first predicted future high demand date; transmitting the notification regarding the first predicted future high demand date to at least one physical resource user in the plurality of physical resources users; at least partly in response to a detection of an activation of the control via which a reservation may be initiated for the first physical resource for the first predicted future high demand date, registering a corresponding reservation for the first physical resource for the first predicted future high demand date.

An aspect of the present disclosure relates to non-transitory computer readable memory having program instructions stored thereon that when executed by a computer system device cause the computer system to perform operations comprising: access historical demand data, comprising reservation data, for a first physical resource, the historical demand data comprising dates at which the first physical resource was reserved by a given user, wherein the first physical resource is shared amongst a plurality of physical resource users in a time displaced manner; access historical event data, the historical event date comprising event types and event dates; identify correlations between historical demand data, comprising reservation data, and the historical event data, comprising event types and event dates; predict future high demand dates for the first physical resource based at least in part on the identified correlations between historical demand data, comprising reservation data, and the historical event data, comprising event types and event dates; generate a notification regarding a first predicted future high demand date; transmit the notification regarding the first predicted future high demand date to at least one physical resource user in the plurality of physical resources users; in response to a reservation request, register a corresponding reservation for the first physical resource for the first predicted future high demand date.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

FIG. 1D illustrates an example data storage architecture.
FIGS. 5 and 6 illustrate example user interfaces.

DETAILED DESCRIPTION

Figure 1A:
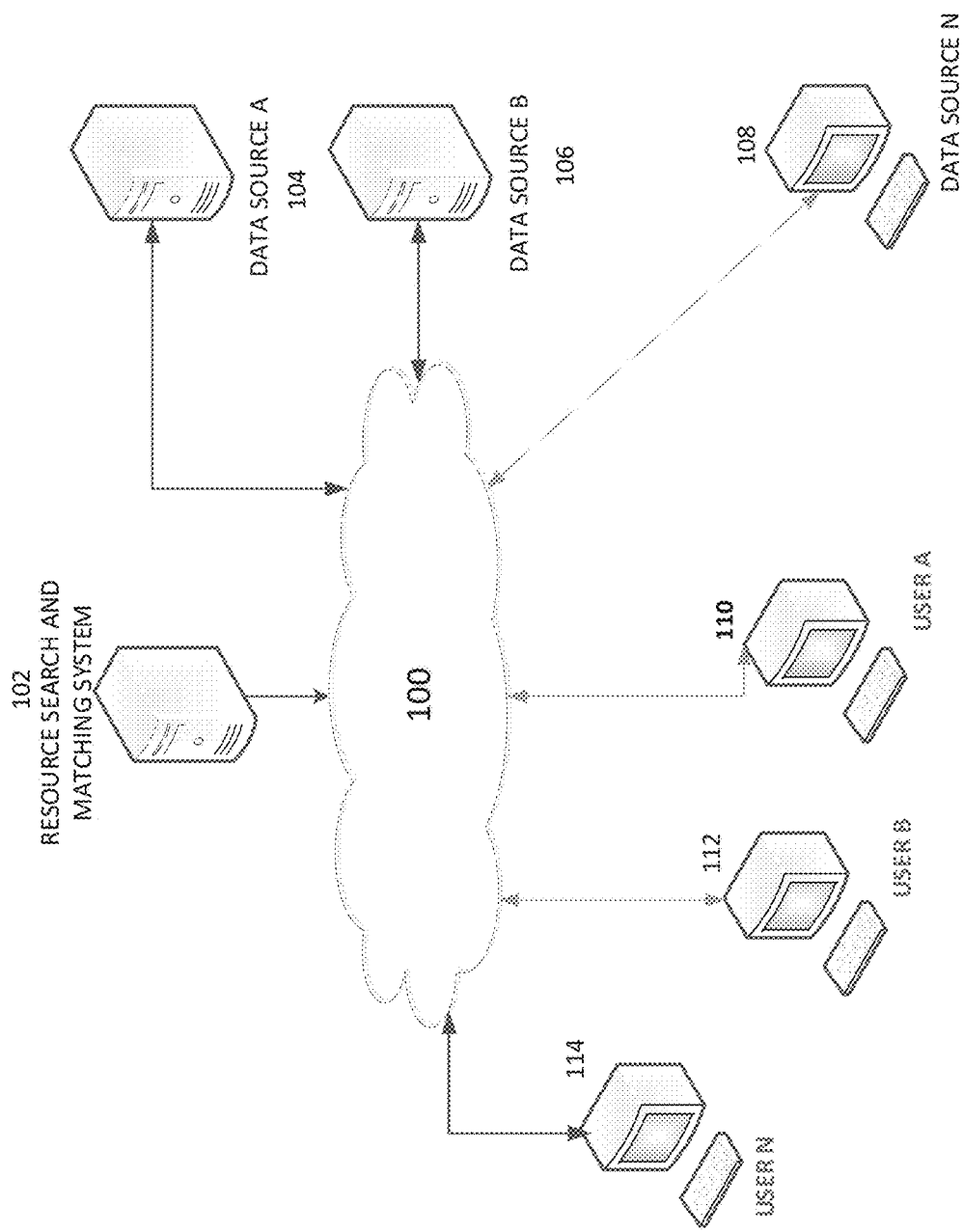
FIG. 1A illustrates an example operating environment.

An aspect of the present disclosure relates to systems and methods for enabling searches to be securely performed for physical resources and/or for potential utilizers of such physical resources to thereby identify potential or likely matches between such physical resources and/or for potential utilizers of such physical resources.

Certain conventional search engines are configured to match search query terms with words and metadata associated with webpages to identify web pages that match the search query terms. However, many such conventional search engines are inadequate to identify matches between physical resources and potential utilizers of such physical resources, particularly when potential utilizers of a given physical resource will be sharing such physical resource with others in a non-overlapping, time-displaced manner (e.g., via random time slice assignment, via a round robin arrangement, via First Come First Serve (FCFS) allocation, etc.).

Conventional search engines crawl webpages using a spider, where the spider downloads web pages and follows connections on the webpages to identify new webpages. A search index may be generated and updated. The index may include the discovered webpage URLs and associated content information. For example, the associated content information may include the type of content as identified via a webpage Schema (a semantic vocabulary of tags or microdata), how recently the webpage was updated, and historical engagement by users with the webpage or domain.

When a user enters a search query into a search field, the search engine identifies pages which are deemed to be relevant from the index. A relevancy ranking algorithm may be used to hierarchically rank the matching pages into a set of results. Certain search engines take into account user location data in ranking search results, such as in response to a query of "movie theaters near me," where the search engine may identify movie theaters near the user based on information (e.g., IP address) indicating the user's current location.

However, as noted above, many conventional search engines are generally directed to simply responding to queries from a user. Such conventional search engines are not configured to and do not attempt to find an optimum or preferred set of different potential physical resource utilizers based at least in part on attributes of the potential physical resource utilizers and on attributes of the physical resource.

In contrast to conventional systems, the exemplary systems and processes described herein may be configured to match users with physical resources based on a variety of user attributes and physical resource attributes and may determine/predict an optimum or preferred set of resource utilizers for one or more physical resources (e.g., utilizing a neural network, an expert system, a rules-based systems, and/or a support vector machine). As will be described, the exemplary systems and processes overcome several technical challenges in matching users with physical resources and in identifying an optimum or preferred set of resource utilizers for one or more physical resources.

For example, a physical resource may be a property comprising an inhabitable structures. Physical resource attributes may include dimensional data, structure configuration data, surface treatment data, geographic location data, elevation data, weather related data, and/or other data. Different physical resources of a given resource type (e.g., a house) may have certain common attributes and may have certain different attributes. Different physical resources may be connected based on such common resource attributes.

Resource utilizers may also have associated attributes. For example, certain resource utilizers may need to utilize a given physical resource during a first common time period, while certain other resource utilizers may need to utilize a given physical resource during a second common time period. By way of further example, certain resource utilizers may need certain minimum dimensions or prefer certain materials. By way of still further example, certain resource utilizers may desire proximity to certain amenities or activity areas. Different physical resources utilizers may be connected based on such common resource utilizer attributes.

Where a physical resource attribute of a given physical resource corresponds to resource utilizer attribute, a connection may be formed. The greater the number of connections the more likely that a physical resource will be a match for the resource utilizer. A negative connection may be formed, where the resource utilizer affirmatively does not want houses with certain characteristics (e.g., located above a certain floor level in a multistory condominium building).

Connections may likewise be formed between potential physical resource utilizers. Such connections may be positive connections or negative connections. For example, where two physical resource utilizers need or desire certain common physical attributes with respect to a physical resource, a positive connection may be established. By way of further example, where two physical resource utilizers need or desire to use a physical resource during the same time frame, a negative connection may be established as their needs may conflict.

Certain connections (whether positive or negative) may be weighted differently than other connections, where the weighting may reflect the importance of the connection in determining a suitability (e.g., the suitability of a given physical resource for a given physical resource utilizer, the suitability for two physical resource utilizers to share time sliced access to the physical resource).

Thus, for example, a physical resource utilizer affinity with a given physical resource may optionally be determined based at least on the number of positive connections and the number of negative connections with the physical resource and on the weights associated with respective connections. A match score may optionally be generated using the following formula (e.g., where a connection may be a positive number (1) or a negative number (−1)):

$$\text{Match score} = \text{Connection}^1 \times \text{Weight}^1 + \text{Connection}^2 \times \text{Weight}^2 \ldots + \text{Connection}^N \times \text{Weight}^N$$

Similarly, a physical resource utilizer's suitability to share a physical resource with another physical resource utilizer may be determined based at least on the number of positive connections and the number of negative connections with the other physical resource utilizer and on the weights associated with respective connections. A suitability score may optionally be generated using the following formula (e.g., where a connection may be a positive number (1) or a negative number (−1)):

$$\text{Suitability score} = \text{ResourceUtilizerConnection}^1 \times \text{Weight}^1 + \text{ResourceUtilizerConnection}^2 \times \text{Weight}^2 \ldots + \text{ResourceUtilizerConnection}^N \times \text{Weight}^N$$

Optionally, a stochastic model (configured to estimate probability distributions of potential outcomes by allowing for random variation in one or more inputs over time) and/or a neural network, such as those described herein (e.g., a convolutional neural network and/or a Long short-term memory (LSTM) neural network), may be utilized to identify matches. For example, the neural network may include one or more convolution layers+ ReLU, one or more pooling layers, and a loss function, and/or one or more LSTM elements.

Although, certain examples will be discussed with respect to building structures and/or property (e.g., vacation homes, condominiums, houses, camp grounds, etc.), the systems and processes described herein may be applied to other physical resources, such as motorized vehicles, computer devices and resources, entertainment devices, or other physical resources.

Further, while certain examples will be discussed with respect to fractionalized ownership interests in a physical resource (e.g., via direct ownership, via a company that owns the physical resource, such as a limited liability company that owns a vacation home, via syndicates operating as private member groups, etc.), where a given user owns one or more shares in the building structure and property, certain systems and processes described herein may be applied to non-fractionalized ownership of physical resources.

Optionally, rather than purchasing a share in a physical resource, users may be enabled to lease the equivalent share(s). The lease may be in the form of a lease-to-buy program, where at the end of the lease (e.g., a 1 year lease, a 2 year lease, a 5 year lease, or other lease length), or earlier, the user may purchase the share(s). Optionally, the user may be enabled to apply some or all of the lease amount previously paid to the share purchase price. The share purchase price may be the same as the share purchase price at the time the user entered into a lease or the share purchase price may be adjusted to reflect the current fair market value of the share or house (e.g., to reflect the increase or decrease since the lease was entered into). Thus, the lease is configured to provide the feeling of a purchase.

Optionally, the entity offering the services described herein may act as a condominium board for a given property.

By way of non-limiting example, a given physical resource may have 2 shares, 4 shares, 6 shares, 8 shares, 12 shares, 26 shares, on other number of shares. Although the ownership interest may be expressed as shares, other mechanisms may be used reflecting a corresponding percentage ownership interest. For example, if there are a total of 8 shares, and a given user has 2 shares, that user owns 25% of the physical resource (e.g., directly or via an intermediate company).

Identifying which physical resources are suitable for a given user can be highly complicated and very challenging for a search engine to identify. For example, where the physical resource is a house (e.g., a vacation home), houses have an enormous number of variables, making it exceptionally difficult to conduct a search for a house that is a suitable or optimized match for a user.

By way of illustration, house attributes may include house value, cost of a share in the house (or cost of a share in the company that owns the house), number of shares in the house (or in the company that owns the house), average income of households in neighborhood, geographical location, elevation, type of house (e.g., standalone house, attached house, condominium, high rise apartment, etc.), architectural style (e.g., colonial, modern, Mediterranean, cape cod, Spanish-style, cabin, farmhouse, etc.), total square footage of the house, total square footage of the property, number of floors, number and size of bedrooms, bedroom configurations (e.g., en suite (having its own bathroom), not en suite, fireplace, etc.), number and size of bathrooms, bathroom configurations (e.g., configured with bathtub, spa tub, shower, toilet room, etc.), location of the master bedroom (e.g., first floor, second floor, etc.), whether the house has certain types of rooms and their size (e.g., family room, game room, dining room, breakfast room, living room, gym, screening room, etc.), number of fireplaces, existence and size of backyard, existence and size a swimming pool, existence and size of a hot tub, existence and size of a basketball court, existence and size of a tennis court, whether there is a fenced yard, the existence and type of views (e.g., no view, ocean view, partial ocean view, lake view, partial lake view, mountain view, partial mountain view, canyon view, partial canyon view, etc.), the weather (e.g., temperature, snow, hail, humidity, on a month-by-month basis), the distance to neighboring houses, the distance from ski slopes and/or other winter sport locations, the distance from hiking trails, the distance from boating areas, the distance from shopping areas, the distance from cultural institutions (e.g., museums, concert halls, libraries, etc.), the distance from airports, the extent of local public transportation, and so on.

Further, if the house is furnished, the complexity of searching for and identifying a house suitable for a given user is further increased. For example, the furnished house attributes may include furniture style (e.g., modern, traditional, mid-century, etc.), furniture brand, furniture quality level, décor (e.g., paintings, photographs, sculptures, mirrors, decorative items, planters, vases, candle holders, wall clocks, lamps, pillows, etc.), the existence and type of gaming equipment (e.g., foosball table, ping pong table, pool table, game console, etc.), the number and size of televisions, and/or the like.

The house attributes may optionally be populated in whole or in part using data accessed from one or more local or third party data sources. For example, the house and property square footage may be determined from a municipal tax data store, the architecture style may be determined using computer vision to analyze images accessed from mapping services, furnishing data may be determined using computer vision to analyze images of the interior of the house, and/or the like. By way of further example, elevation and other geographical and view related information (e.g., whether the house is located on a mountain, beach, lakefront, canyon, etc.; whether the house has: no view, an ocean view, a partial ocean view, a lake view, a partial lake view, a mountain view, a partial mountain view, a canyon view, a partial canyon view, etc.) may be determined using Geographic Information Systems (GIS) data and/or by analyzing images of the area surrounding or adjacent to a house (e.g., using images from mapping services). By way of still further example, the location of recreational activities (e.g., sports activities, cultural activities, etc.), shopping locations, and the like may be determined via one or more mapping services. Weather data may be determined via one or more weather databases (e.g., the Climate Data Online database).

The computer vision analysis of images (e.g., photographs) to determine an architectural style of a given house may be performed using a deep convolutional network trained using images of different houses of different architectures, and then comparing the neural network weights of a photograph of the given house with the neural network weights corresponding to the images of different houses of different architectures to identify which weights most closely match those of the given house. The weights of a given architecture that mostly closely match those of the given house may then be assigned to the given house.

The computer vision analysis of images (e.g., photographs) to identify furniture, kitchen appliances, décor, and the like may utilize automatic image tagging wherein metadata in the form of captioning or keywords are automatically assigned to an image. A neural network (e.g., a convolutional neural network or a Long short-term memory (LSTM) neural network) may be utilized in the tagging of image to identify furniture. The neural network may include a preprocessing layer where the image (e.g., in the RGB color space) image is taken and the mean image values are subtracted. A deep convolutional neural network may be used to generate a segmentation map of an input image a multilayer deconvolution network which may be used on top of the convolutional network. For example, the deep convolutional neural network may include convolution layers with ReLU (a rectified linear activation function that is a piecewise linear function that outputs the input directly if it is positive, otherwise, the ReLU function will output zero), max pooling layers (e.g., to down sample the detection of the most activated features in feature maps), fully connected layers with ReLU, and a softmax cross entropy loss function used to adjust neural network weights via backpropagation.

Although it is technically challenging to search for and identify a house that is suitable for a given user, the technical challenge is greatly increased when the search engine is to identify a potential set of users, where each user in the set is suitable for a given house, and each user in the set is suitable to share the house with other users in the set in a time displaced manner (where the users do not utilize the house at the same time, but instead each user utilize the house at different times).

The technical challenge is further exacerbated where users are not assigned set periods of time to use the house, but may reserve the house for a certain number of stays in a given time period, for a certain number of days in a given time period, for a certain number of special dates (e.g., public holidays, popular vacation days, other days of expected high demand, etc.) in a given time period, where the house may be unavailable on certain days (e.g., for maintenance), etc. Example systems and methods for reserving a physical resource are described in Patent Application No. 63/053,113, titled "Reservation System", filed Jul. 17, 2020, the content of which is incorporated herein by reference in its entirety, and may be used in conjunction with the systems and methods described herein to reserve physical resources and otherwise. Functionality described herein and/or in Patent Application No. 63/053,113 may be provided via webpages served to a user device via the web server, via a bowser extension installed on a browser hosted on the user device, via a dedicated application installed on the user device, and/or otherwise.

The disclosed systems and methods may, for example, optionally determine a user's suitability for a house based on user attributes determined using explicit data provided by the user and/or implicit data determined for the user. Such explicit data may include user preferences specified by the user via a preference user interface. The preference user interface may enable the user to specify some or all of the attributes described herein and/or other attributes (including, where appropriate, a minimum value (such as a minimum number of bedrooms), a maximum value (such as the maximum share price), or a range of values (such a range specifying a minimum-maximum property square footage or share prices). The explicit data may optionally include demographic information regarding the user (e.g., the user's age, whether the user has a partner, how many children the user has, the age of the children, the total number of people who will be staying at the house during the user's reserved time period, etc.), preferred time periods to use the house, desired activities with respect to the house (e.g., sporting activities, cultural activities, etc.), whether the user prefers to fly or drive to the house, and/or the like. The explicit data may further include search terms entered by the user via a search field.

The implicit data may include the user's location (e.g., as determined via a geolocation application programming interface, via an IP address, etc.), information derived from the user's location (e.g., average house prices in area, average income levels in area, etc.), websites previously visited by the user (e.g., as determined by cookie data accessed from the user device), social networking accounts, and/or other data.

When conducting a search, the search engine may utilize the explicitly provided data and/or the implicit data to search for available properties, which may be referred to as houses (e.g., where one or more shares are available to purchase)

that have attributes that at least partly match (are "connected to") the user attributes. The search engine may provide the search results for display on the user device. The search results may be ranked by the search engine in accordance with how closely a house's attributes match those of the user (e.g., based on the number of matches, and the weight importance of such matches).

A given search result entry for a property/house may include some or all of the following: an image of the house, the number of total shares for the house, the cost of each share, the total value of the house (e.g., the total number of shares×the share value, the actual total cost to purchase the house (optionally include the cost of the furnishings and amenities), and/or the fair market value), the name of the house, the location of the house (e.g., the city or town the house is located in), the number of bedrooms, the number of baths, the square footage of the house, and/or other facts regarding the house.

In response to the user selecting a search result entry (e.g., by clicking on an entry), additional information regarding the house may be presented. For example, additional images may be presented, a video tour of the house may be presented, the actual house address may be presented, and a description of the amenities of the house and the locale of the house may be presented. Optionally, a download link may be provided, which when activated, will cause a document (e.g., a PDF document) to be downloaded to the user system providing some or all of the foregoing property information and/or other house-related information. Optionally, a map and/or a link to a map may be provided where the map shows the location of the house, the surrounding area, points of interest, streets (including street names). Optionally, a satellite view may be accessible. Optionally, the map be zoomable. Optionally, nearby facilities (e.g., shopping facilities, entertainment facilities, restaurants, etc.) and attractions may be shown on the map, optionally with the distance to the house indicated.

An interface may be provided via which the user may request a virtual or in person tour of the house. Optionally, a chat interface is provided via which the user can request additional information from a service person, and may initiate a share purchase. Optionally, a control is provided via which the user may purchase one or more shares (e.g., with few, or even one purchase control activation).

The user may instruct the search engine to further refine the search by specifying one or more filters (which may be treated as additional search terms) relating to one or more of the house attributes or the user attributes.

Optionally, if a given house identified as a match already has shares owned by one or more other users, the search engine will attempt to determine how compatible the user conducting the search is with the existing share owners using the positive and/or negative connections. For example, user attributes that indicate a certain likelihood of a conflict in terms of a desire to utilize the house during the same time period may cause a house to be ranked lower in the search results or eliminated from the search results altogether. The greater the number of existing stakeholders (e.g., shareholders) the searching user is predicted to have a time conflict with, the more the house ranking will be reduced and/or the more likely the house will be eliminated from the search results altogether.

By way of illustration, if an existing stakeholder has school age children and the searching user has school age children, there may be a greater likelihood of a conflict in a desired house usage period (e.g., school vacations). By way of further illustration, if an existing stakeholder has school age children and the searching user does not have children, there may be a lesser likelihood of a conflict in a desired house usage period. By way of yet further illustration, if an existing stakeholder enjoys participating in winter sports and the searching user also enjoys participating in winter sports, there may be a greater likelihood of a conflict in a desired house usage period (e.g., during the winter snow season or other seasonal conflict). By way of still further illustration, if an existing stakeholder enjoys participating in winter sports and the searching user enjoys participating in summer sports, there may be a lesser likelihood of a conflict in a desired house usage period.

A given physical resource may be shared amongst users. Conventional resource allocation systems disadvantageously fail to predict high demand periods of resource utilization, and hence fail to adequately allocation such physical resource amongst the sharing users.

The systems and methods described herein may also be configured to identify/predict days of likely high demand among stakeholders (which may be referred to as a special date). For example, a learning engine (e.g., a neural network) or algorithm may be utilized to model user reservation behavior with respect to a house. The learning engine may be trained using a historical set of reservations, where the learning engine makes predictions as to the likelihood a house will be reserved on a given day. A loss function may be used to adjust the neural network weights based on the accuracy of a given prediction.

Optionally, a neural network may be configured as a Long short-term memory (LSTM) neural network An LSTM which is a type of recurrent neural network (RNN) architecture having feedback connections, that may be particularly advantageous in deep learning applications, such as in predicting human behavior (e.g., house reservations). LSTMs are designed to preserve information that may be relevant for future tasks for long period of time so that the past information can be connected to a present task.

A given LSTM unit may include a cell and regulators used to regulate the flow of information inside the LSTM unit. For example, the regulators may include an input gate, an output gate and a forget gate. The cell may be used to keep track of the dependencies between the elements in the input sequence. Because the cell comprises a memory unit, the cell can process data sequentially and retain its hidden state through time.

A prediction engine may include a data pre-processing component, a multi-layer long short-term memory (LSTM) neural network for user behaviors, a pattern adapter for mining behavior patterns, and attention component configured to adjust the weights of the LSTM and the pattern adapter.

As discussed above, the neural network may be trained in a supervised manner on a set of training data in order to determine network weights so as to reduce the error/loss function. For example, the connections between the LSTM gates may be assigned weights determined during training, which determine the operation of the LSTM gates.

If a given date (or date range) is predicted to be a high demand date, such information may be used to generate notifications which may be transmitted to one or more stakeholders (e.g., via email, messaging service, an app notification, or otherwise) informing such stakeholders that such date (or date range) is predicted to be in high demand and that they should make a reservation as soon as possible if they want to reserve the house for such date.

Optionally the notification may be first transmitted to the stakeholder that has gone the longest time since reserving a special date and the notification may include a reservation confirmation control. Optionally, the house may be automatically reserved in such stakeholder's name for a period of time (e.g., 24 hours, 48 hours, or other time period), and if the stakeholder confirms the reservation (e.g., by activating the confirm reservation control), the reservation will maintained. If the stakeholder does not activate the confirm reservation control within the time period (or activates a reservation release control provided in the notification), the reservation will be released. The process may be repeated for the stakeholder that has gone the next longest time since reserving a special date, and so on.

Optionally, instead, the notification may be transmitted to all house stakeholders at substantially the same time, and the reservation may be provided on a first come first serve basis (e.g., where the first stakeholder that confirms the reservations is assigned the reservation, so long as it does not violate a reservation rule, such as those described in Patent Application No. 63/053,113, titled "Reservation System", filed Jul. 17, 2020). Optionally, where the notification is transmitted to all house stakeholders, such notification may include a different link or code associated with the reservation control for each house stakeholder. Thus, when a stakeholder activates the reservation control, the system may be able to uniquely identify the stakeholder and initiate the reservation process for the identified stakeholder.

Optionally, in addition to or instead of determining a high demand date for the house as a whole, the system may identify dates that a particular user is likely to want to make a reservation (which may be referred to as a special personal date). For example, such identification may be performed based on historical reservation data for the user (e.g., did the user reserve the same date in multiple years) and/or on personal data for the user (e.g., a wedding anniversary, a birthday, etc.). If a given date (or date range) is predicted to be a special personal date for the user, such information may be used to generate a notification which may be transmitted to the user informing the user that such date (or date range) is predicted to be a date that the user may want to make a reservation for based on past history and/or personal data (e.g., a wedding anniversary, a birthday, etc.). Optionally, such notification may not be sent if the date is generally a special date for stakeholders (e.g., a federal holiday). Optionally, the notification is not transmitted if, based on reservation rules, the user is not eligible to reserve the house for the special personal date (e.g., as a result of the user's pending and/or past reservation).

Optionally, the house may be automatically reserved in such user's name for a period of time (e.g., 24 hours, 48 hours, or other time period), and if the user confirms the reservation (e.g., by activating the confirm reservation control), the reservation will maintained. If the user does not activate the confirm reservation control within the time period (or activates a reservation release control provided in the notification), the reservation will be released.

Optionally, the system will enable a given stakeholder to exchange usage of the stakeholder's rights to use their house for a period of time with a stakeholder in another house. Such an exchange (and corresponding reservations for specific dates) may be received and stored by the system. Optionally, if there is price differential in the share value of one house as compared to the other house, the stakeholder with the lower value share may be charged a prorated amount (the value of the dates reserved at the higher share value hose minus the value of the dates reserved at the lower share value house), and such prorated amount may be provided to the other stakeholder in whole or a portion thereof.

Certain of the foregoing processes may be utilized to determine what house (or other physical resource) attributes are more significant in making a house (or other physical resource) attractive to potential users at different share values. Those attributes may then be advantageously used to identify other houses similar attributes that are likely to be attractive to potential share purchasers. Such identified houses may then be offered to potential stakeholders as described elsewhere herein.

For example, the common attributes of houses for which shares were purchased may be identified. In addition, the speed at which the shares were purchased may be taken into account. For example, common attributes of houses whose shares sold within a first amount of time (e.g., 30 days) may be identified that are not present in houses that sold in a second amount of time (e.g., greater than 30 days).

Graph theory may be applied to determine the connectedness between different houses. Attributes of a given house may be rated, and such attributes can be compared with that of other houses (e.g., houses which may be potentially offered to potential stakeholders) to determine how similar the houses are. Houses can then be placed into a network, with each house placed on a node, and edges between similar houses, and rating how strong the tie is between two houses.

When a house has its shares sell quickly, the system may identify other houses (that have not yet been purchased or reserved to offer for sale to potential share purchasers) that have the strongest edges to the quickly selling house. Such identified house may then be offered for sale as similarly described above (e.g., where shares may be sold to multiple users to provide fractional ownership interests). If the identified house sells quickly as well, then the attributes common with the original house may be weighted more heavily as being attractive to potential purchasers. If the identified house sells significantly more slowly, then the attributes common with the original house may be weighted less heavily, indicating that such attributes may be less attractive to potential purchasers. Thus, the graph may be utilized to assist in identifying which houses should be offered to users.

Optionally, crowd sourcing may be used in identifying houses to offer for fractionalized ownership. For example, a tool may be provided that sits on top of a real estate website offering houses for sale in the traditional non-fractionalized sale method. The tool may be provided via JavaScript embedded in or called by the real estate website webpage or the tool may be provided via a browser extension. The tool may calculate a share price for a house identified on the real estate website webpage for different scenarios (e.g., assuming that there are 2 shares, 4 shares, 6 shares, 8 shares, etc.) based on the listed house price, estimate cost of housing and amenities (which may be based on the house's listed square footage, the number of bedrooms, the number and types of other rooms, etc.), the cost associated with forming the entity acquiring the house (e.g., a limited liability company), etc.

If the user is interested in purchasing one or more shares in the acquiring entity, if one were formed, the user may activate a control via the tool which will cause a link to the property to be transmitted to the system of the entity that offers houses for fractional ownership. The entity may review the link, may place the house (e.g., its attributes) in the graph and/or otherwise evaluate the house attributes, and decide whether to offer the house for fractional ownership to the referring user and other users. If the entity decided to offer the house for fractional ownership, it may be posted as described above and identified in searches.

Certain example aspects will now be described with reference to the figures.

An example system architecture that may be utilized to perform services described herein (e.g., search services, matching services, special date prediction services, graphing services, and/or other services described herein) will now be discussed with reference to FIG. 1A. The various systems and devices may communicate with each other over one or wired and/or wireless networks 100 (e.g., the Internet, Ethernet, or other wide area or local area network). In the illustrated embodiment, a resource search and matching system 102 may be hosted on one or more servers. The resource search and matching system 102 may be cloud-based and may be accessed by one or more user computer systems 110, 112 over the network 100. User computer systems 110, 112, 114 and data source computer systems 104, 106, 108 may be able to share software applications, computing resources, and data storage provided by the resource search and matching system 102.

The user computer systems 110, 112, 114 and data source computer systems 104, 106, 108 may be in the form of a desktop computer, laptop computer, tablet computer, mobile phone, smart television, dedicated server system, cloud-based system, and/or other computing system. The data source systems 110, 112, 114 may supply various items of data discussed herein, such as data that may be used to determine attributes associated with a physical resource (e.g., a house) and attributes associated with a user. By way of illustrated example, the data source systems may include GIS databases, map databases, tax databases, permitting databases, weather databases, demographic databases, and so on.

A user computer system and a data source computer system may include user input and output devices, such a displays (touch or non-touch displays), speakers, microphones, trackpads, mice, pen input, printers, haptic feedback devices, cameras, and the like. A user system or data source computer system may include wireless and/or wired network interfaces via which the computer systems may communicate with each other or the resource search and matching system 102 over one or more networks.

User interfaces described herein are optionally configured to present data (optionally in real time) from sources described herein and to receive user commands, which may optionally be executed by the resource search and matching system 102 in real time or in batch mode.

A client (e.g., a system browser or a dedicated network resource access application hosted by a user computer system) may initiate a handshaking message to the resource search and matching system 102. The handshaking message may identify the cipher suites supported by the client and other cryptographic information (e.g., the maximum supported version of transport layer security or secure sockets layer, the client's order of preference). The handshaking message may optionally identify data compression methods supported by the user computer system. The handshaking message may include a random byte string that may be used in generating encryption keys.

The resource search and matching system 102 may respond to the client with a handshaking signal which identifies the cipher suite suit and encryption version (selected from those identified in the client handshaking message) that will be used. The resource search and matching system 102 message may also include a session ID and another random byte string. The resource search and matching system 102 may additionally transmit its digital certificate. The resource search and matching system 102 may also transmit a client certificate request that identifies the types of certificates supported and the Distinguished Names of acceptable Certification Authorities (CAs), which the client may verify.

The random byte string transmitted by the client to the resource search and matching system 102 may be utilized by both the client and the resource search and matching system 102 to generate a secret key that may be used for encrypting subsequent message data. Asymmetric encryption may be utilized to generate a shared secret key. The random byte string itself may be encrypted with the resource search and matching system 102's public key.

By way of further example, a given item of data may encrypted using an AES-128 key or public key cryptography/asymmetrical cryptography. If symmetric encryption is used, than the encryption key and the decryption key may be the same key. If public key cryptography/asymmetrical cryptography is used, then a public key may be used to encrypt the data and a private key may be generated to decrypt the data.

Optionally, a version of the user interfaces described herein may be enhanced for use with a small touch screen (e.g., 4 to 13 inches diagonal), such as that of a mobile phone or a tablet computer. For example, the orientation of the controls may be relatively more vertical rather than horizontal to reflect the height/width ratio of typical mobile device display. Further, the user interfaces may utilize contextual controls that are displayed in response to an inferred user desire, rather than displaying a large number of tiny controls at the same time (which would make them hard to select or manipulate using a finger).

Figure 1B:
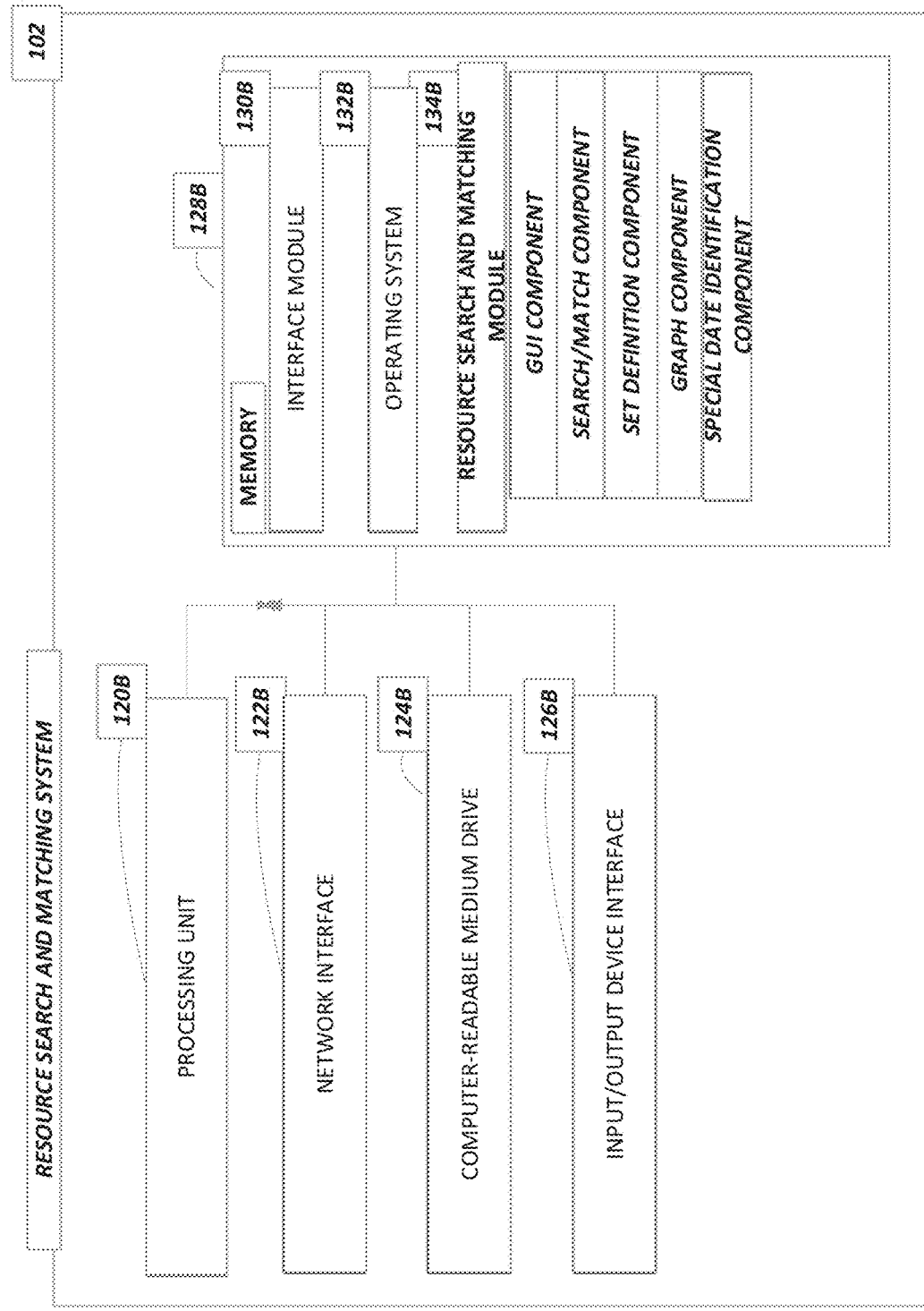
FIG. 1B illustrates resource search system architecture.

FIG. 1B depicts a block diagram illustrating an embodiment of example components of the example resource search and matching system 102 hosting a resource search and matching system module 134B. The system includes an arrangement of computer hardware and software components that may be used to implement aspects of the present disclosure. Those skilled in the art will appreciate that the example components may include more (or fewer) components than those depicted in FIG. 1B.

The system hosting the resource search and matching system module 134B may include one or more processing units 120B (e.g., a general purpose processor and/or a high speed graphics processor with integrated transform, lighting, triangle setup/clipping, and/or rendering engines), one or more network interfaces 122B, a non-transitory computer-readable medium drive 124B, and an input/output device interface 126B, all of which may communicate with one another by way of one or more communication buses.

The network interface 122B may provide connectivity to and communications with one or more networks or computing systems (e.g., one or more of the systems illustrated in FIG. 1A). The processing unit 120B may thus communicate information and instructions to and/or from other computing devices, systems, or services via a network. The processing unit 120B may also communicate to and from memory 124B and further provide output information via the input/output device interface 126B. The input/output device interface 126B may also accept input from one or more input devices, such as a keyboard, mouse, digital pen, touch screen, microphone, camera, other sensors, etc.

The memory 128B may contain computer program instructions that the processing unit 120B may execute in order to implement one or more aspects of the present disclosure. The memory 120B generally includes RAM, ROM (and variants thereof, such as EEPROM) and/or other persistent or non-transitory computer-readable storage media. The memory 120B may store an operating system 132B that provides computer program instructions for use by the processing unit 120B in the general administration and operation of the resource search and matching system module 134B, including it components.

The resource search and matching system module 134B may include a GUI component configured to generate graphical user interfaces which may be displayed on user systems, a search component configured to perform search functions as described herein, a matching component configured to perform matching functions as described herein, a graph component configure to perform graph functions as described herein, and a special date component configured to predict special dates for a given house stakeholder (e.g., a shareholder), for all house stakeholder, and/or for stakeholder of multiple houses The memory 128B may store user accounts including user preferences, explicitly provided data, inferred data, demographic data, share ownership data, user reservation data, user-specific special dates, user contact information, and/or other user data discussed herein. Optionally, in addition or instead, the data may be stored remotely on a cloud-based or other networked data store. The account data may optionally be stored in a relational database, an SQL database, a NOSQL database, a hierarchical database, an object oriented database, a graph database, and/or other database type.

The memory 128B may include an interface module 130B. The interface module 130B can be configured to facilitate generating one or more interfaces through which a compatible computing device may send data to, or it may receive data from the resource search and matching module 134B.

The modules or components described above may also include additional modules or may be implemented by computing devices that may not be depicted in FIGS. 1A and 1B. For example, although the interface module 130B and the resource search and matching module 134B are identified in FIG. 1B as single modules, the modules may be implemented by two or more modules and in a distributed manner. By way of further example, the processing unit 120B may include a general purpose processor and a graphics processing unit (GPU). The system hosting the resource search and matching module 134B may offload compute-intensive portions of the applications to the GPU, while other code may run on the general purpose processor. The GPU may include hundreds or thousands of core processors configured to process tasks in parallel. The GPU may include high speed memory dedicated for graphics processing tasks. As another example, the system hosting the resource search and matching system module 134B and its components can be implemented by network servers, application servers, cloud-base systems, database servers, combinations of the same, or the like, configured to facilitate data transmission to and from data stores, and other party systems via one or more networks. Accordingly, the depictions of the modules are illustrative in nature.

Figure 1C:
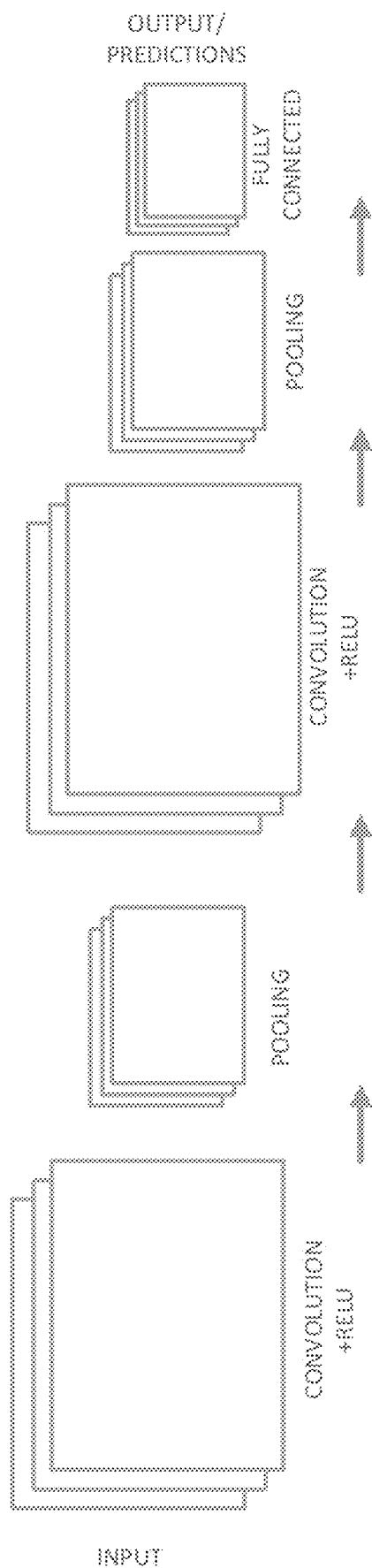
FIG. 1C illustrates an example convolutional neural network architecture.

Referring now to FIG. 1C, an example convolutional neural network architecture is illustrated. As discussed herein, a neural network may be used to identify and match users with physical resources, perform computer vision operations (identify and classify objects, such as furniture), and may be used to automatically identify an architectural style of a house.

In this example, the neural network includes convolution+ReLU layers, which together with the pooling layers act as feature extractors with respect to an input image (e.g., an image of an exterior or interior of a house), and the fully connected layer acts as a classifier. There may be more or fewer layers than those illustrated in FIG. 1C. Further, there does not need to be a pooling layer for each convolution+ReLU layer.

The convolutional neural network may be trained. The neural network filters and weights may be initialized with random values. A training image may be used as in input. A forward propagation step may be performed (e.g., convolution, ReLU, and pooling operations, and forward propagation in the fully connected layer) and the convolutional neural network may generate output probabilities for each class. The total error at the output layer may be calculated using an error function. Backpropagation may be used to update filter values and node weights to reduce or minimize the output error. The weights may be adjusted in proportion to their contribution to the total error. This process may be repeated for multiple training images (e.g., images of houses or furnishings) so as to train the convolutional neural network to correctly identify image objects.

FIG. 1D illustrates an example data storage architecture. A data store 100D may include one or more databases that store one or more records. The stored data may be used by various processes described herein. For example, the data may be used in search for matching physical resources for a user, such as a user having a resource searcher/matching application 110D installed on the user's device or accessed via a browser. By way of illustration, user may be searching for a property in which the user may acquire a share, as discussed elsewhere herein. The search may be performed using the search/matching component 102D. The search and matching process may use historical and predicted scheduling data, existing share owner data, property attributes, and/or searcher data in identifying potential property matches.

By way of further example, the data may be used to predict dates of high utilization for a given physical resource and provide such predictions via a resource utilizer application 108D. For example, the resource utilizer may own a share in a property as discussed elsewhere herein. The resource utilizer application 108D may also be used to reserve a property in which the user owns a share.

A physical resource data store 102D may include details/attributes regarding various resources, such as residences/properties. For example, physical resource data store 102D may store for one or more properties some or all of the following data: geographic location, location type (e.g., coast, lake, river, mountain, river, canyon, etc.), house value, cost of a share in the house, number of shares in the house, average income of households in neighborhood, elevation, architectural style, total square footage of the house, total square footage of the property, number of floors, number and size of bedrooms, bedroom configurations, number and size of bathrooms, bathroom configurations, location of the master bedroom, whether the house has certain types of rooms and their size, number of fireplaces, existence and size of backyard, existence and size a swimming pool, existence and size of a hot tub, existence and size of a basketball court, existence and size of a tennis court, whether there is a fenced yard, the existence and type of views, weather data for different months and/or seasons, the distance to neighboring houses, the distance from ski slopes and/or other winter sport locations, the distance from hiking trails, the distance from boating areas, the distance from shopping areas, the distance from cultural institutions, the distance from airports, the extent of public transportation, and/or other attributes.

A physical resource utilizers data store 104D may store details/attributes regarding physical resource utilizers, such as owners of shares in a given property. For example, the data may include the number of persons in the share owner's family, the address/geographical location of the owner's primary residence, special dates of interests, marital/partner status, number of children, age of children, preferred sporting activities, preferred cultural activities, other user attributes disclosed herein, and/or the like.

A scheduling and utilization data store 106D may store access information (e.g., for a property), future scheduled reservations for utilization of a given property, historical scheduled reservations for utilization of a given property, historical scheduled events (e.g., concerts, festivals, concert sporting events, conventions, art shows, and/or other events that typically attract significant or very large numbers of people), future scheduled events, correlations between events and/or seasons on property reservations, and/or the like.

Figure 2:
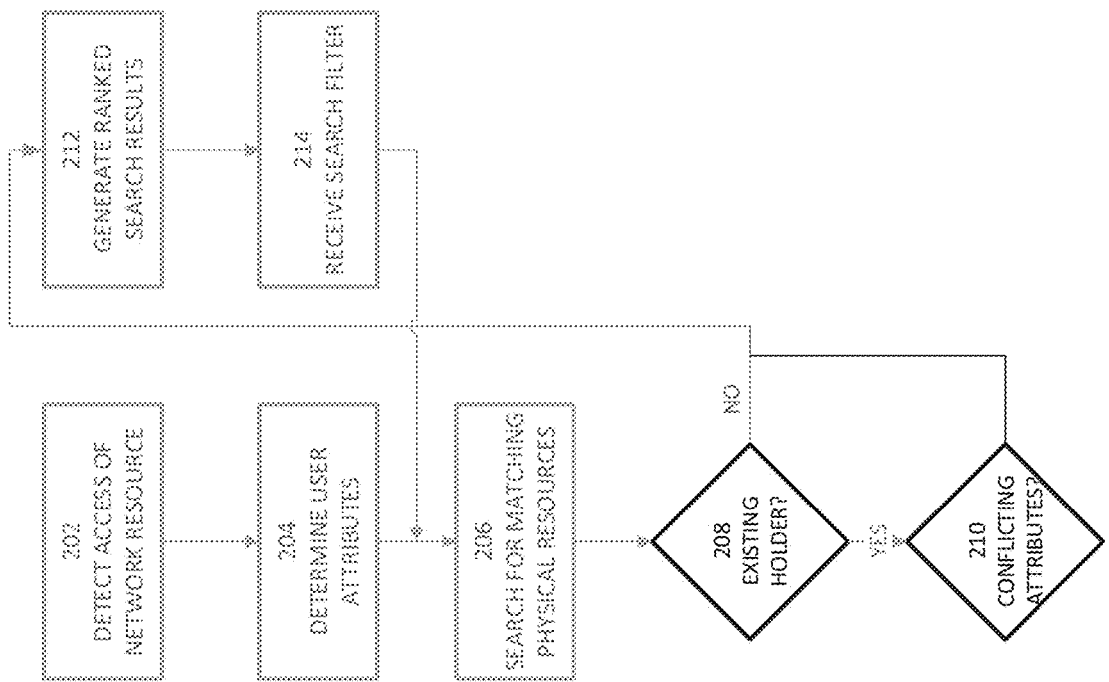
FIG. 2 illustrates an example search process.

FIG. 2 illustrates an example process for match resource utilizers with physical resources. At block 202, the process detects that a user device is accessing a network resource, such as a webpage associated with an offer of fractional ownership of a physical resource, such as a house (which may include surrounding land). At block 204, certain user attributes may be determined, such as location and user characteristics from the user's browsing history. For example, GOOGLE ANALYTICS may be utilized to determine certain demographics regarding a user (e.g., age, income, etc.).

At block 206, user attributes may be utilized to search a data store of a pool of physical resources (e.g., vacation houses) whose attributes more closely correspond to the user's attributes. For example, a user's income level and location may be used, in part, to identify houses whose share prices and locations are more likely to be suitable for the user. As discussed elsewhere herein, a formula, trained neural network or other learning engine may optionally be used to identify matches. A match score may be generated that reflects the closeness of the match.

If there is not any or a sufficient user attributes available to conduct the search and identify corresponding matches in an adequate manner, optionally a default set of houses may be presented to the user in a default order (where the presented houses may optionally be limited to those that are still available for fractional ownership).

If there are sufficient user attributes available to conduct the search and identify matches in an adequate manner, at block 208, a determination may be made as whether are any existing stakeholders (e.g., shareholders or other users that have a fractionalized interest in a given house) in a given house. If a determination is made that there are existing stakeholders, user attributes for such holders may accessed from a data store.

At block 210, a determination may be made that attributes associated with the existing stakeholders for the given house and that attributes associated with the user conflict. For example, a conflict may be one that makes it more likely that the user and an existing stakeholder will want to use the house at the same time (e.g., where the user and the stakeholder have children of similar ages and may have similar vacation timings). Such a conflict determination may be made using a formula, a trained neural network and/or other learning engine. The existence and/or degree of the conflict may be used to adjust or refine the corresponding match score for the given house (where the adjusted or refined match score may be a new score or may be the original score multiplied by an adjustment factor). For example, the greater the conflicts (e.g., the greater the number and weight of conflicts) the greater the reduction in a match score for the given house.

At block 212, the match scores (as modified due to conflicts) may be utilized to generate ranked search results. Optionally, the search results may be automatically filtered to eliminate houses whose match scores fall beneath a specified threshold (and so may unlikely to be suitable for the user). The ranked search results may then be provided for presentation on the user device.

At block 214, the user may provide additional search filters. Such filters may be expressly provided, such as search terms entered into a search field, or user specified house attributes or ranges of attributes (e.g., minimum number of bedrooms, presence of a pool, state in which the house is located, minimum number of shares in the house, maximum number of shares in the house, share price range, other attributes discussed herein, etc.). Certain filters may be based on user-provided data regarding the user (e.g., typical vacation dates, income, marital/partner status, number of children, age of children, preferred sporting activities, preferred cultural activities, preferred restaurant cuisines/styles, view preferences (e.g., ocean, mountain, etc.), user demographic and preference data, other user attributes disclosed herein, and/or the like). The process may then proceed to block 206, and the process of generating and presenting ranked search results may be repeated using the filters.

As discussed elsewhere herein, a learning engine (e.g., a neural network) or algorithm may be utilized to predict dates that will be in high demand for a house that has multiple stakeholders whose desire to reserve the house may be conflict. For example, as discussed above, a Long short-term memory (LSTM) neural may be used that is especially efficacious in predicting human behavior (e.g., user house reservations).

Figure 3:
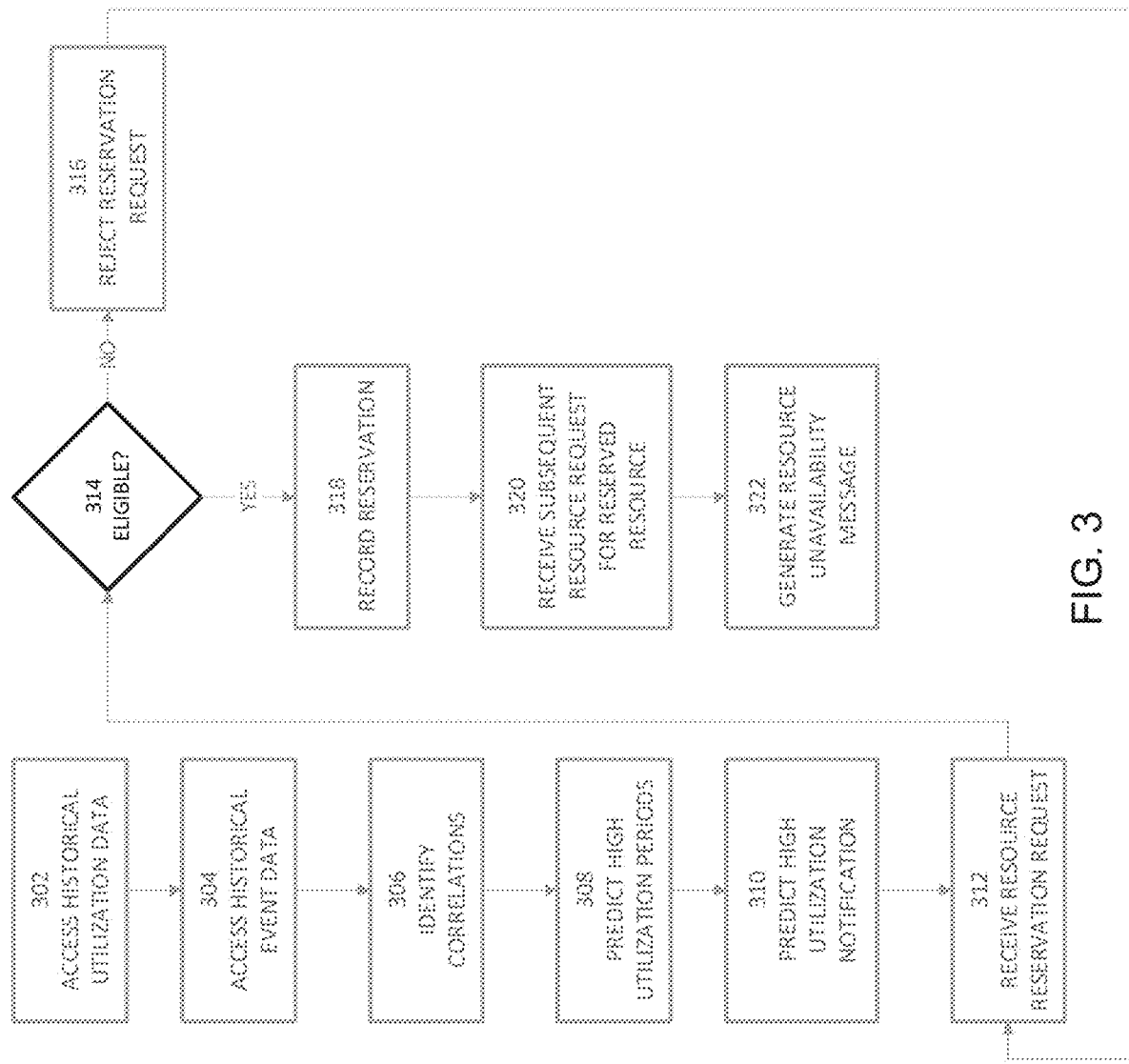
FIG. 3 illustrates a resource utilization prediction process.

FIG. 3 illustrates an example process of predicting high demand dates. At block 302, historical house utilization data for the house is accessed from a data store. Historical house utilization data may include dates reserved for the house in the past by users and/or dates that users attempted to reserve. For example, if one user reserved the house for a given date (which may include several consecutive days), and another user subsequently requested a reservation for the same date and was refused because the house was already reserved, such refused reservation may be included in the category of attempted reservation. By way of further, if one user reserved the house for a given date and other users were placed on a waitlist, each person on the waitlist may count towards attempted reservations.

At block 304, historical event data (including event types, dates, and/or time) is accessed from one or more data sources (which may be operated by third parties, such as ticketing databases, venue databases, sport team databases, museum databases, etc.). Such event data may include past concerts, festivals, sporting events, conventions, art shows, and/or other events that typically attract significant or very large numbers of people.

At block 306, correlations, if any, are identified between the historical house utilization data and the historical event data. The number of attempted reservations for a given date that corresponds to a date of an historical event, may indicate the strength of the correlation. For example, if four out of eight stakeholders reserved or attempted to reserve the house for a weekend at which a yearly music festival takes place, the process may determine that there is a strong correlation between the yearly music festival and the high demand. The correlation may be further strengthened for each year that there is high demand for the house that correlates with the occurrence of the music festival (even if the date of the music festival may vary from year to year).

At block 308, the correlations, the strength of correlations, and the dates and types of future scheduled events may be utilized to predict high utilization dates. For example, if a past recurring event is associated with high utilization demand, the process may predict that there will be high demand on a future date of the event. By way of further example, if there is historical high utilization demand for a variety of different art shows at a museum, a prediction may be made that upon the occurrence of a future art show at the museum there will be high demand.

At block 310, a high utilization notification may be generated identifying a predicted high utilization date or a set of dates (e.g., predicted high utilization date for the coming year or other selected time period). The notification may optionally indicate why the date is predicted to be a high utilization date. For example, the notification may identify an event associated with the high utilization date and may indicate that there has been high demand in the past on dates associated with the event. The notification may optionally be transmitted to all stakeholders in the house. The notification may include a control, which when activated will cause a reservation to be automatically requested for the corresponding date.

Optionally, rather than transmitting the high utilization notification to all stakeholders, the notification may first be transmitted to one, selected stakeholder. For example, the stakeholder that has had the fewest or most aged reservations for special dates may be identified, and the notification may first be transmitted to the identified stakeholder. The notification may indicate that the stakeholder has a specified limited period of time to make the reservation before other stakeholders receive the notification. If the identified stakeholder does not make the reservation within the specified time period, the notification may be transmitted to the stakeholder that has the next most aged reservations for special dates and so on, or, alternatively the notification may be transmitted to all stakeholders.

At block 312, a reservation request is received from a stakeholder (e.g., via an activation of a reservation control in the notification). At block 314, a determination is made as to whether, based on the stakeholder's reservations for future dates and/or past reservations, the stakeholder is eligible for the reservation. If it is determined that the stakeholder is ineligible for the reservation, at block 318, the reservation is rejected and the stakeholder is so notified. Optionally, prior to sending a notification to a stakeholder, a determination may be passed as to whether the stakeholder is ineligible for the reservation, and if so, the notification may be inhibited from being transmitted to the ineligible stakeholder.

If the stakeholder is eligible, at block 318, stakeholder's reservation is recorded. The stakeholder may then utilize the house for the corresponding date. If a subsequent reservation request is received from another stakeholder at block 320, at block 322 the request will be rejected and a corresponding reservation denial message may be generated and transmitted to the requesting stakeholder. Optionally, an interface may be provided via which the requesting stakeholder may request to be placed on a waiting list for the date, in the event the original requester cancels her reservation.

Figure 4:
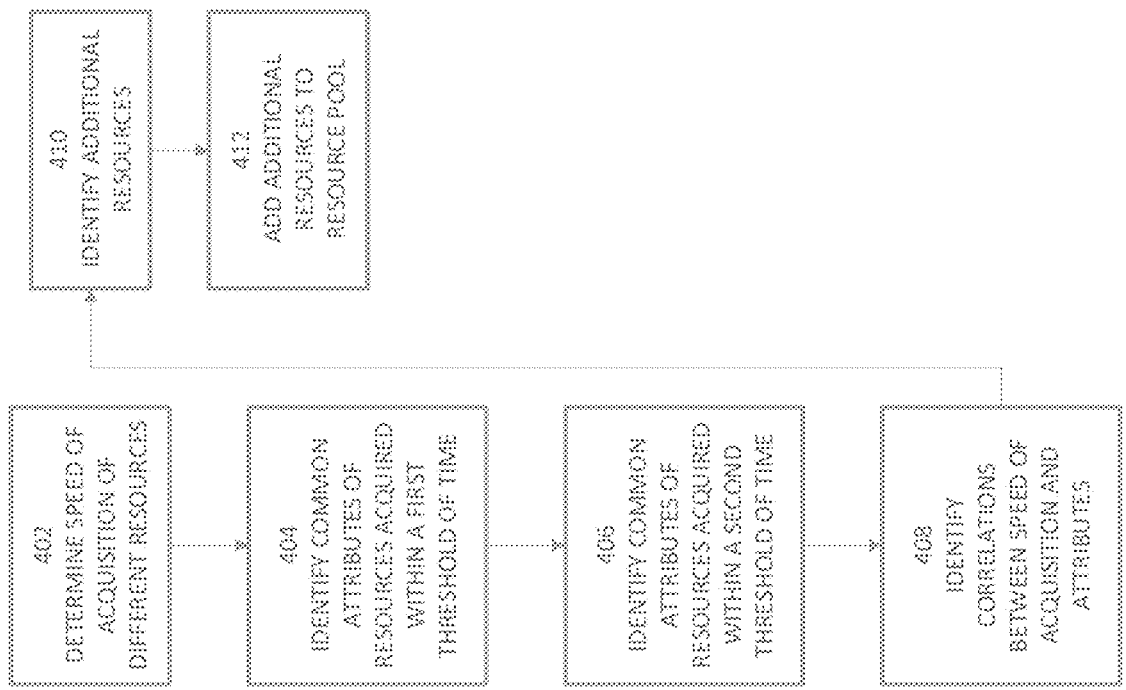
FIG. 4 illustrates an example process for identifying resources to add to a resource pool.

It may be advantageous to determine what house (or other physical resource) attributes are more significant in making a house (or other physical resource) attractive to potential users at different share values. Those attributes may then be advantageously used to identify other houses similar attributes that are likely to be attractive to potential share purchasers (e.g., using graph theory as discussed elsewhere herein). Such identified houses may then be added to a pool of available houses and offered to potential stakeholders as described elsewhere herein. FIG. 4 illustrates such an example process.

At block 402, the acquisition history for physical resources, such as houses may be accessed from a data store. For example, the speed in which shares in different houses were purchased once posted for sale may be determined. At block 404, attributes of the different houses may be accessed from a data store.

For example, house attributes may include some or all of the following: house value, cost of a share in the house, number of shares in the house, average income of households in neighborhood, geographical location, elevation, architectural style, total square footage of the house, total square footage of the property, number of floors, number and size of bedrooms, bedroom configurations, number and size of bathrooms, bathroom configurations, location of the master bedroom, whether the house has certain types of rooms and their size, number of fireplaces, existence and size of backyard, existence and size a swimming pool, existence and size of a hot tub, existence and size of a basketball court, existence and size of a tennis court, whether there is a fenced yard, the existence and type of views, the weather, the distance to neighboring houses, the distance from ski slopes and/or other winter sport locations, the distance from hiking trails, the distance from boating areas, the distance from shopping areas, the distance from cultural institutions, the distance from airports, the extent of public transportation, or other attributes.

At block 404, common attributes may be identified for houses whose shares were sold within a first, relatively quick time period (e.g., 30 days). At block 406, common attributes may be identified for houses whose shares were sold within a second, somewhat slower time period (e.g., greater than 30 days or 31-60 days). Optionally, the same process of identifying common attributes may be determined for additional time periods (e.g., 61-90 days, 91-160 days, 161-365 days, etc.).

At block 408, correlations between the speed of share acquisition and house attributes may be determined. For example, attributes may be identified that are common to those houses that sold in the first period of time, but are not present in attributes of houses sold in a second period of time. Such attributes may then be identified as potentially contributing to the enhanced attractiveness of houses to potential acquirers of shares.

At block 410, a search may be conducted of one or more data stores (e.g., real estate databases or websites) to identify houses being offered for sale that have some or all of those attributes identified as contributing to a relatively fast sale of house shares. At block 412, one or more of such houses may be added to the resource pool of houses and shares in such houses may be offered for sale as similarly described elsewhere herein.

Certain example user interfaces will now be described that enable certain functionality described herein to be provided to users.

Figure 5:

Referring to FIG. 5, an example user interface is illustrated displaying a first set of houses. The set of houses may be selected using the process illustrated in FIG. 2 and/or may have been added to the set via the process illustrated in FIG. 4. Optionally, the set of houses may be a default houses that are not selected based on user attributes.

Referring to FIG. 5, the user interface displays images, cost, number of bedrooms, number of bathrooms, and square footages of several houses. In response to the user selecting one of the houses (e.g., by clicking on a linked element, such as text or an image), the example user interface of FIG. 6 may be displayed on the user device.

The user interface illustrated in FIG. 6, may provide additional images of the selected house, the name of the house, the house address, the cost of a share in the house, the number of bedrooms in the house, the number of bathrooms in the house, and the square footage of the house. In addition or instead, other house attributes described herein may be presented. Optionally, some or all of the information presented via the user interface illustrated in FIG. 6 may also be presented via the user interface illustrated in FIG. 5.

Thus, systems and methods are described for enabling searches to be securely performed for physical resources and/or for potential utilizers of such physical resources to thereby identify potential or likely matches between such physical resources and/or for potential utilizers of such physical resources (e.g., vacation homes). Further, systems and methods are described for predicting high utilization dates for physical resources. In addition, systems and methods are described for physical resources that are suitable to add to a pool of physical resources.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to enable searches for physical resources, comprising:
   a network interface;
   an application specific integrated circuit (ASIC), implementing a first neural network, the ASIC comprising:
   one or more long short-term memory units configured to keep track of dependencies between an elements in an input sequence, the one or more long short-term memory units comprising:
   a cell, and
   regulators, the regulators including an input gate, an output gate and a forget gate;
   at least one processing device operable to:
   access attributes of a plurality of physical resources, wherein a given physical resource in the plurality of physical resources is configured to be shared amongst a plurality of physical resource users in a time displaced manner;
   receive over a network, using the network interface, a communication providing attributes for a first user;
   search for physical resources in the plurality of physical resources that correspond with attributes of the first user, wherein a second neural network is used to identity a first set of physical resources in the plurality of physical resources using the attributes of the first user and the attributes of the plurality of physical resources;
   generate and associate respective match scores with physical resources in the first set of physical resources identified using the second neural network;
   identify a subset of physical resources comprising physical resources in the first set of physical resources that at least one other user of the system has received a right to use;
   identify, using the first neural network, users associated with the subset of physical resources that have at least a first likelihood of temporal usage conflicts with the first user;
   based at least in part on the identified users associated with the subset of physical resources that have at least the first likelihood of temporal usage conflicts with the first user, adjusting one or more match scores associated with one or more physical resources in the subset of physical resources;
   generate, based at least in part on the adjusted match scores, ranked search results for the first set of physical resources identified using the second neural network;
   filter the ranked search results to filter out ranked search results having a match score that fails to satisfy a first threshold;
   provide the filtered ranked search results, generated based at least in part on the adjusted match scores, to a first user device, the ranked search results configured to be displayed by the first user device; and
   in response to the user selecting a given search results in the filtered ranked search results, cause a download control for a first document to be displayed on the first user device; and
   in response to the user activating the download control, download the first document to the first user device.

2. The system as defined in claim 1, wherein:
   the second neural network comprises:
   one or more convolution layers with a rectified linear activation function;
   one or more max pooling layers; and
   a loss function.

3. The system as defined in claim 1, wherein the plurality of physical resources comprises inhabitable building structures having a plurality of rooms configured to perform a plurality of functions.

4. The system as defined in claim 1, wherein the attributes of the plurality of physical resources comprise respective geographical data related to respective locations of the plurality of physical resources and dimensional data related to respective physical resources in the plurality of physical resources.

5. The system as defined in claim 1, wherein the attributes of the plurality of physical resources comprise furnishings of at least one physical resource and dimensional data associated with the physical resources.

6. The system as defined in claim 1, wherein the attributes of the first user comprise data regarding a family of the first user.

7. The system as defined in claim 1, wherein the attributes of the first user comprise data regarding recreational activity preferences of the first user.

8. The system as defined in claim 1, wherein at least a first temporal usage conflict comprises a seasonal conflict.

9. The system as defined in claim 1, wherein the system is configured to perform operations comprising inhibiting the given physical resource configured to be shared amongst the plurality of physical resources users from being utilized by a first physical resource user and a second physical resource user during a same time period.

10. The system as defined in claim 1, wherein the system is configured to access at least a portion of the attributes of the plurality of physical resources from a plurality of remote data stores operated by different entities, including at least a climate data store.

11. The system as defined in claim 1, wherein the system is configured to determine one or more attributes of the plurality of physical resources by analyzing images of the plurality of physical resources and/or images of areas in respective proximity of the plurality of physical resources using a computer vision neural network.

12. The system as defined in claim 1, wherein the system is configured to determine one or more attributes related to respective views from the plurality of physical resources by analyzing images of the plurality of physical resources using a computer vision neural network and/or using geographic information system data.

13. A computer-implemented method, the method further comprising:
    accessing, by a computer system comprising one or more computing devices, attributes of a plurality of physical resources, wherein a given physical resource in the plurality of physical resources is configured to be shared amongst a plurality of physical resource users in non-overlapping time periods;
    receiving over a network at the computer system a communication providing attributes for a first user;
    searching for and identifying, using the computer system, a first set of physical resources, in the plurality of physical resources, that correspond to the attributes of the first user using the attributes of the plurality of physical resources;
    generating and associating, using the computer system, respective match scores with physical resources in the first set of physical resources;
    identifying, using the computer system comprising a first neural network, a subset of physical resources comprising physical resources in the first set of physical resources that at least one other user of the computer system has received a right to use;
    identifying, using the computer system, users associated with the subset of physical resources that have at least a first likelihood of temporal usage conflicts with the first user;
    based at least in part on the identified users associated with the subset of physical resources that have at least the first likelihood of temporal usage conflicts with the first user, generating, using the computer system, one or more refined match scores associated with one or more physical resources in the subset of physical resources;
    generating, using the refined match scores, ranked search results for at least a portion of the first set of physical resources;
    filtering the ranked search results to filter out ranked search results having a match score that fails to satisfy a first threshold;
    providing the filtered ranked search results, generated using the refined match scores, to a first user device, the ranked search results configured to be displayed by the first user device;
    in response to the user selecting a given search results in the filtered ranked search results, causing a download control for a first document to be displayed on the first user device; and
    in response to the user activating the download control, downloading the first document to the first user device.

14. The method as defined in claim 13, wherein searching for and identifying, using the computer system, the first set of physical resources in the plurality of physical resources, that correspond to the attributes of the first user, using the attributes of the plurality of physical resources, further comprises using a neural network to identify the first set of physical resources, wherein the neural network comprises:
    a convolutional neural network, including
        one or more convolution layers; and
        a loss function;
    and/or
    a long short-term memory neural network comprising one or more long short-term memory elements.

15. The method as defined in claim 13, wherein identifying, using the computer system, users associated with the subset of physical resources that have at least the first likelihood of temporal usage conflicts with the first user comprises using a Long short-term memory (LSTM) neural network to identify the users associated with the subset of physical resources that have at least the first likelihood of temporal usage conflicts with the first user.

16. The method as defined in claim 13, wherein identifying, using the computer system, users associated with the subset of physical resources that have at least the first likelihood of temporal usage conflicts with the first user comprises identifying negative connections and negative connection weights between the first user and the users associated with the subset of physical resources that have at least the first likelihood of temporal usage conflicts with the first user.

17. The method as defined in claim 13, wherein the plurality of physical resources comprises inhabitable building structures having a plurality of rooms configured to perform a plurality of functions.

18. The method as defined in claim 13, wherein the attributes of the plurality of physical resources comprise geographical data related to a location of at least one physical resource and dimensional data related to at least one physical resource.

19. The method as defined in claim 13, wherein the attributes of the first user comprise data regarding a family of the first user.

20. The method as defined in claim 13, wherein the attributes of the first user comprise data regarding recreational activity preferences of the first user.

21. The method as defined in claim 13, wherein at least a first temporal usage conflict comprises a seasonal conflict.

22. The method as defined in claim 13, the method further comprising inhibiting the given physical resource configured to be shared amongst the plurality of physical resources users from being utilized by a first physical resource user and a second physical resource user during a same time period.

23. Non-transitory computer readable memory having program instructions stored thereon that when executed by a computer system cause the computer system to perform operations comprising:

access attributes of a plurality of physical resources, wherein a given physical resource in the plurality of physical resources is configured to be shared amongst a plurality of physical resource users in non-overlapping time periods;

access attributes for a first user;

identify, using the attributes of the plurality of physical resources, a first set of physical resources in the plurality of physical resources that correspond to the attributes of the first user;

identify a subset of physical resources comprising physical resources in the first set of physical resources that at least one other user of the computer system has received a right to use;

identify users associated with the subset of physical resources that have at least a first likelihood of temporal usage conflicts with the first user;

based at least in part on the identified users associated with the subset of physical resources that have at least the first likelihood of temporal usage conflicts with the first user, generate one or more match scores associated with one or more physical resources in the subset of physical resources;

generate, based at least in part on the generated match scores, ranked search results using the first set of physical resources;

filter the ranked search results to filter out ranked search results having a match score that fails to satisfy a first threshold;

provide the filtered ranked search results, generated based at least in part on the generated match scores, to a first user device, the ranked search results configured to be displayed by the first user device;

in response to the user selecting a given search results in the filtered ranked search results, cause a download control for a first document to be displayed on the first user device; and in response to the user activating the download control, download the first document to the first user device.

24. The non-transitory computer readable memory as defined in claim 23, wherein identifying the first set of physical resources in the plurality of physical resources, that correspond to the attributes of the first user, using the attributes of the plurality of physical resources, further comprises using a first neural network to identify the first set of physical resources, wherein the first neural network comprises:

a convolutional neural network including:
one or more convolution layers; and
a loss function;
and/or
a long short-term memory neural network comprising one or more long short-term memory elements.

25. The non-transitory computer readable memory as defined in claim 23, wherein identifying users associated with the subset of physical resources that have at least the first likelihood of temporal usage conflicts with the first user comprises using a Long short-term memory (LSTM) neural network to identify the users associated with the subset of physical resources that have at least the first likelihood of temporal usage conflicts with the first user.

26. The non-transitory computer readable memory as defined in claim 23, wherein the attributes of the plurality of physical resources comprise geographical data related to a location of at least one physical resource and dimensional data related to at least one physical resource.

27. The non-transitory computer readable memory as defined in claim 23, wherein the attributes of the first user comprise data regarding a family of the first user.

28. The non-transitory computer readable memory as defined in claim 23, wherein the attributes of the first user comprise data regarding recreational activity preferences of the first user.

29. The non-transitory computer readable memory as defined in claim 23, wherein at least a first temporal usage conflict comprises a seasonal conflict.

30. The non-transitory computer readable memory as defined in claim 23, the operations further comprising inhibiting the given physical resource configured to be shared amongst the plurality of physical resources users from being utilized by a first physical resource user and a second physical resource user during a same time period.

* * * * *